(12) United States Patent
Rodriguez et al.

(10) Patent No.: US 7,094,496 B2
(45) Date of Patent: Aug. 22, 2006

(54) ELECTRICAL ACCUMULATOR BATTERIES

(75) Inventors: Rafael Ruiz Rodriguez, Guadalajara (ES); Antonio Ripoll Anton, Guadalajara (ES); Ernesto Collado Parra, Guadalajara (ES)

(73) Assignee: S.E.Acumulador Tudor, S.A., Guadalajara (ES)

( * ) Notice: Subject to any disclaimer, the term of this patent is extended or adjusted under 35 U.S.C. 154(b) by 409 days.

(21) Appl. No.: 10/210,343

(22) Filed: Jul. 31, 2002

(65) Prior Publication Data

US 2003/0059676 A1    Mar. 27, 2003

(30) Foreign Application Priority Data

Jul. 31, 2001    (ES)    ................................ 200101795

(51) Int. Cl.
| H01M 2/02 | (2006.01) |
| H01M 2/12 | (2006.01) |
| H01M 6/10 | (2006.01) |
| H01M 2/36 | (2006.01) |

(52) U.S. Cl. .................... 429/94; 429/82; 429/120; 429/159; 429/164

(58) Field of Classification Search ................. 429/94, 429/159, 120, 82, 164
See application file for complete search history.

(56) References Cited

U.S. PATENT DOCUMENTS

| 6,007,937 A | * | 12/1999 | Ruiz Rodriguez et al. ..... 429/94 |
| 6,221,524 B1 | * | 4/2001 | Andrew et al. ................ 429/94 |
| 6,632,560 B1 | * | 10/2003 | Zhou et al. ................... 429/99 |

FOREIGN PATENT DOCUMENTS

| ES | 2 134 149 | 9/1999 |
| ES | 2 166 284 | 4/2002 |
| ES | 2 179 734 | 1/2003 |

* cited by examiner

*Primary Examiner*—John S. Maples
(74) *Attorney, Agent, or Firm*—Marshall, Gerstein & Borun LLP

(57) ABSTRACT

An electric accumulator battery, constituted of a series of independent modules, each of which comprises a recipient with a lid subdivided into cells in which positive and negative helically wound electrodes and an intermediate separator are housed. The recipient of each module comprises an outer wall, of straight rectangular prismatic shape, and an inner wall which defines three cylindrical cells (9) of coplanar axes, tangent to each other and closed on the lower base. Axial ventilation passages are defined between these two walls, which pass through the base through openings (5 and 6).

10 Claims, 19 Drawing Sheets

ELECTRICAL ACCUMULATOR BATTERIES

The present invention refers to an electric accumulator battery, preferably the lead-acid type, of those used in the starting, lighting and semi-traction of automobiles, among other uses.

More specifically, the battery of the invention generically refers to a conventional type accumulator, also of the type called flooded, although it preferably refers to a gas recombination type accumulator with the outlet for such gases regulated by means of a valve, also called an immobilized electrolyte type accumulator, either because of said electrolyte being imbedded in a rmicro-fiberglass separator or for being in the form of gel.

More specifically, the battery of the invention is of the type incorporating cells, in each one of which there are only two bound plates, one positive and the other negative, both plates being helically wound and being physically separated by micro-fiberglass layers, in which the electrolyte is immobilized, and being capable of recombining the gases produced in the battery's operation.

Even more specifically, the invention refers to an electric accumulator battery formed by coupling one or several cell unit modules of those described in the previous paragraph, in a variety of positions, such that the resulting voltage rating is multiplied and in this way, the energy dispensed by the battery is more usable, as well as also achieving weight and wiring section reduction which is necessary for the electrical system of the vehicle or for the facility using the battery, and also achieving optimization of the free space reserved for said battery for the purpose of it possibly being occupied by it upon adapting its shape to the cavity that would have been reserved for it.

Lead-acid batteries manufactured with the bound, helically wound plates are known; for example, the application of helically wound plates has been known since 1975, according to U.S. Pat. No. 3,862,861, improved in 1982 according to U.S. Pat. No. 4,322,484; the state of the art of helically wound plates has even improved, according to U.S. Pat. No. 4,637,966 from 1987 and Spanish patent 2,134,149 from 1997, which discloses a battery having the relevant novelties regarding the art used up to that time. According to ES 2134149, the grids on which the active material of the electrodes is bound are of a special lead-tin alloy, in which the tin content is of maximum 1.5%, preferably from 0.5 to 1%, for the purpose of it being sufficiently twist resistant to support the helical winding, at the same time having enough hardness to resist the traction and compression exerted by the binding machine during the binding operation it is subjected to and at the same time, the grids must have enough chemical resistance to corrosion so as to ensure a long battery life; the edges of the grids of the battery of the invention limit the binding of the active material; the lower edge is smooth but the upper edge has several outlets or welding pins, which gradually widen to maintain the constancy of the current passage section in relation to the plate surface where said current comes from; in this way, the use of the plates is homogenous and provides a maximum energy/weight ratio in the discharge while optimizing the charge acceptance. The current outlets, here called welding pins or simply pins, of the grids of the battery of the invention have been calculated so that the vertical axis of each pin aligns with the previous one and the latter one for the purpose that when welded, forming only one connector with all the pins on a plate, it is ensured that the pins are welded along their entire width and each plate connector of one sign is facing the connector joining all the pins of the other plate of each cell; the plate pin connectors of the battery of the invention are preferably of a design whose section has a circular sector shape, precisely so that the plate pins are completely welded and with the same allowance, even though these pins are of an increasing width from the center towards the edge of the element, as has been described.

The tendency in automobile manufacturing is to evolve towards more and more sophisticated equipment demanding more and more energy, due to which more powerful batteries are needed, more resistant to the charge-discharge cycles and more reliable, such that the starting function is much more assured.

Some automobile manufacturers are studying the introduction of starter batteries with a voltage higher than the current 12V rating; the possibility of increasing the voltage rating up to 36V is generally sought; with it, several objectives would be reached, among which is increasing the battery reliability index regarding the starting reliability because the current the battery must provide to start the vehicle would be approximately a third of that which is currently needed, and a cost reduction of the automobile would be achieved because the weight and the wiring section would decrease, since by using a higher voltage, the necessary section for transporting the current can be decreased without the existence of the current Ohmic drop problem.

It is a standard practice to manufacture 12V batteries with which only the simple three 12V battery series connection obtains a 36V battery; however, the weight and the space used by the three batteries would be at least three times greater than that of the single battery currently necessary; in addition, the electric connections must be reliable enough and of an optimized section and length so that the ohmic voltage loss is minimal; on the other hand, both the mechanical coupling and electric connection of the three batteries must be strong enough to support the vibrations experienced by the vehicle, especially while traveling on rough terrain.

On the other hand, the currently standardized 12V battery manufacturing forces backing the different cells against one another, originating significant differences in the refrigeration of the elements, such that when the battery becomes heated due to the heat released by the vehicle engine or by the battery's own operation, either charging or discharging, there are cells experiencing a much greater temperature increase than others which are better refrigerated, which generally harms both the operation and life duration of the batteries due to, among other things, the higher electrolyte concentration caused because the cell at the higher temperature will experience a higher evaporation of the water in which the electrolyte acid is dissolved, and also due to the fact that the charge current passing through the battery when the vehicle is running tends to be higher when the battery temperature is higher, and therefore the charge voltage of the hottest cells must increase in order to maintain the constancy of the current passing through them since the cells are connected in series, and this excess voltage generates an oxygen and hydrogen release, or, which is the same, a higher decomposition of the electrolyte water, which contributes to its water being depleted and therefore the acid being concentrated; the more concentrated the electrolyte is, the greater the deterioration experienced by the battery will be, not only because of the active materials and grids being etched, but also because by decreasing the electrolyte water content, the level on the plates descends and can reach the point in which it does not cover them and produces irreparable damages on the plates, welds and separators.

If the cell refrigeration is a big problem in current 12V battery manufacturing, the cell refrigeration problem becomes extremely aggravated when manufacturing a 36V battery.

The mentioned features and advantages can be more easily understood with the aid of the following description made with reference to the attached drawings showing non-limiting embodiment examples.

There have been attempts to solve the problems explained by means of manufacturing compact 36V batteries, for example such as that described in Spanish patent application 9902310 of the same applicants. According to said patent, the battery comprises a recipient with a lid, internally subdivided into a series of cells distributed in two or more parallel rows, between which ventilation holes are formed. This type of battery has a fixed format and dimension, which is defined by the recipient, therefore not permitting its adaptation to holes with different features.

To solve this drawback, modular batteries are known, such as for example that disclosed in Spanish patent application number 200001486 of the same applicants. In this case, each module is composed of a series of independent cylindrical cells, their upper base ending in a common recipient. Although all the cells can have similar refrigeration, the module coupling can be difficult and moreover, the cells are not suitably protected against external actions.

The object of the present invention is to eliminate the described problems by means of an electric accumulator battery, preferably of lead-acid, with bound helically wound plates, constituted on the basis of modules being coupled in order to obtain the desired voltage, 36V for example, and having a refrigeration system hindering the cell temperature from being excessive or differing from one another.

Another object of the invention is to achieve a battery formed from independent modules electrically connected and fixed such that said battery supports the vehicle vibrations without becoming damaged, even though traveling on rough terrain.

According to the present invention, the design of a battery whose voltage rating value is 36V can be done by means of integrating six unitary modules of three cells in a containment and by means of the corresponding electric series connection of these modules, so that the assembly is a compact 36V rating battery, with a shape very similar to that of conventional 12V batteries. that is to say with only one terminal or positive pole and with advantages over traditional batteries.

The battery of the invention is of the type constituted by means of a series of independent modules, each one of which comprises a recipient with a lid, internally subdivided into cells which house the positive and negative helically wound electrodes and an intermediate separator, preferably of micro-fiberglass, whose modules have electric connection terminals and are housed in a containment.

According to the present invention, each module recipient is composed of a prismatic shaped outer wall and an inner wall defining three cylindrical cells being two to two tangent, of coplanar axes and are closed on the lower base. Between the inner and outer walls, there are axial ventilation passages passing through the base and the lid.

In coincidence with the tangency span, the cylindrical cells defined by the inner wall of the recipient of the modules have a notch on the upper edge onto which an electric connector between consecutive cells is tightly coupled.

The lower closed base of the cylindrical cells can be reinforced by means of outer ribs of a diametrical plot, for example.

Each module lid has a peripheral wall on its inner or lower surface facing the outer wall of said module recipient, as well as three tangent, inner annular walls, facing the edge of the cylindrical cells defined by the inner wall of the module recipient. Between the inner and outer walls, the bottom of the lid has an opening facing the module ventilation passages. In addition, inside the central circular wall, this lid has a hole for the electrolyte filling of the central element, while within the circular walls of each one of the two ends, it has two openings, one for the electrolyte filling of the end elements and another provided with a lead bushing hermetically fixed and embedded to the edge of the hole and through which the outlet terminal of the end elements and the current tap terminal pass and are fixed on by welding.

On the outer surface, the module lid has a central slot in which the three electrolyte filling holes end. This slot is covered and closed by means of a tap of the same shape.

Inside each cell, a positive helically wound electrode and a negative helically wound electrode with the corresponding intermediate separator will be introduced into each of the cylindrical cells to form the module; the elements are provided with upper pins welded to the corresponding connector, the consecutive connectors of the adjacent cells being automatically coupled by means of connectors adjusted in the upper gap of the tangency zone between each two adjacent cells. Lastly, the lid is arranged on the recipient such that the free edge of the inner and outer walls of the recipient and the lid are facing for their coupling by means of traditional binding systems, except the part located on the connectors, which is free for the gas outlet.

For forming the battery with the desired voltage, the modules with the described arrangement will be housed in a containment composed of a straight, rectangular prismatic receptacle, open on its upper base and dimensioned so as to tightly receive the number of necessary modules, which are externally backing each other and electrically connected in series. This receptacle has openings on the bottom facing the ventilation openings of the module.

Near their free edge, the smaller walls of the receptacle which shape the containment will have outer anchoring for fixing holding strips or bands crossing over the modules housed in the containment and hindering the movement thereof.

The recipient shaping the containment can also be closed by means of a lid having holes for ventilating the module cells.

The lid can be fixed to the receptacle by means of anchoring externally located on the smaller walls of both components, these anchoring also being able to serve for fixing handles easing the battery handling and carrying.

Each three celled module comprising the battery of the invention can have an internal pressure regulating valve of the cells of the module. This valve can be of a known constitution and assembly as shall later be explained.

The features and advantages of the battery of the invention can be better understood with the aid of the following description made with reference to the attached drawings, showing non-limiting embodiment examples.

BRIEF DESCRIPTION OF THE DRAWINGS

In the drawings:

FIG. 27 shows a shape of the typical, almost square battery, generally constructed for military uses; FIG. 28 shows a 36V battery with the standardized shape for using in trucks; the battery shown in FIG. 29 is a standard starter battery model but with all the terminals as special threaded terminals.

FIG. 1 shows a module of three lead-acid elements or cells; each of the elements has a voltage rating of 2V; by being internally connected in series, the voltage rating of the module shown here is 6V; the module recipient or containment, indicated with number 1, is formed by a prism containing a set of three two-to-two tangent cylinders; on the end of the first and the last of the cylinders, there are terminals of the battery module, the positive terminal indicated here with number 2 and the negative with number 3; this figure shows terminals of a shape and size being found on the specialized market, sold by some manufacturers; these types of terminals are commonly designed as angular terminals or poles and can be found on the market with the Hofman trademark, reference 911, among others; however, the terminals of each battery module, object of the present invention, can be of the standardized DIN size or of any of the standardized sizes and types currently existing on the market (threaded, etc.) required for being used in vehicle starter batteries, as can be seen in the subsequent views.

FIG. 2 shows a rear view of the same module of FIG. 1, in which the safety outlet hole of the hypothetical gases possibly produced inside the cells is indicated with 4.

FIGS. 3 and 4 show two views of each module recipient. FIG. 3 shows an upper perspective view of the module recipient, while FIG. 4 shows a lower perspective view of the same recipient. The four holes of the corners of the module have been indicated with number 5, which will serve to refrigerate the outer cells in the end areas; the other four holes of the central refrigeration of the cells have been indicated with number 6; the bottom of each of the cylinders corresponding to a cell is indicated with number 7; these bottoms are reinforced with two crossed ribs to increase its resistance to frictions and possible impacts to which they may be exposed; the inner cavity of the three cylinders is where the plates or wound electrodes and their corresponding welding of each cell are to be located; the area where the necessary series connection between cells in order to achieve the 6V ratings of the module will be located is indicated with number 8; the edge of each one of the cylindrical cells is indicated with number 9, constituting the heat-sealed area with the first of the lids, which will be discussed upon describing FIG. 5.

FIG. 5 shows the assembly of three plates or electrode elements, connected in series in order to provide 6V; in this case, the cylindrical elements with orbital technology are shown, that is to say that the electrodes are helically wound and the anode and the cathode are separated by an isolating layer of micro-fiberglass; each one of these cylinders will be introduced into the corresponding cylindrical cavity of the recipient of FIG. 3; here, one of the possible connection types between the elements is shown; in this case, it is an automatic weld carried out by casting a special, highly corrosion resistant lead-tin alloy in special molds; number 10 marks the end plate connector of one sign, in this case, negatives, the negative pins of the end element welded on the lower part, shown here with number 17, and ending in a negative terminal on the upper part, indicated with number 14, which in turn must be welded to the terminal indicated with 3 in FIG. 1. Number 12 marks the positive connector of the end element, the pins indicated with 18 welded under the positive plate of the element, and ending above in the terminal indicated with 15, which in turn will be welded to the terminal indicated with number 2 in FIG. 1. Number 11 indicates the two negative central connectors, which are connected by welding under the negative plate pins 17 and each one ends in an inter-cell connector in the upper part indicated with 16. Number 13 indicates the two positive central connectors, which are connected by welding under the positive plate pins 18 and end in the inter-cell unions 16 in the upper part. By introducing the packets shown in FIG.

Figure 3:
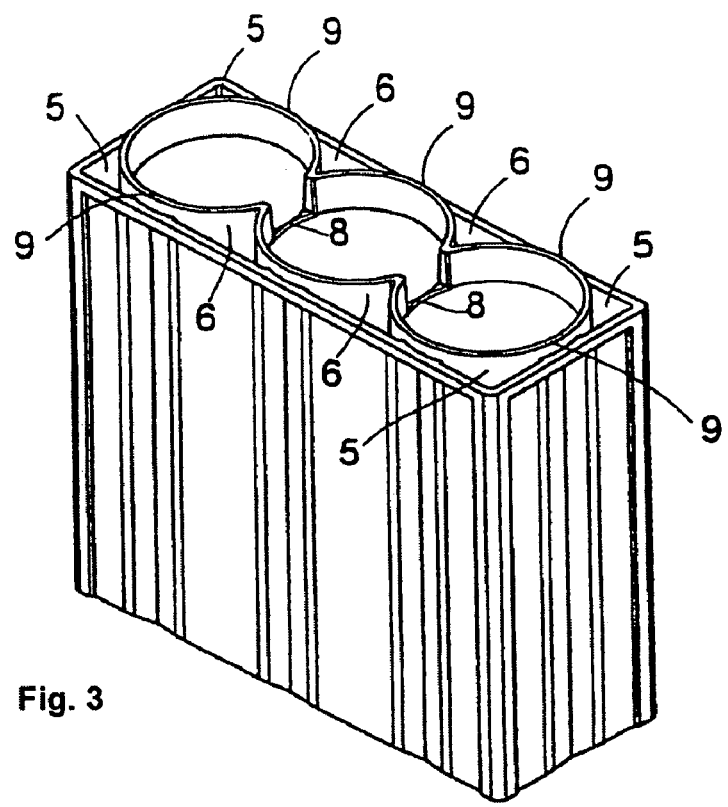
FIGS. 3 and 4 show upper and lower perspective views, respectively, of the recipient of the module shown in FIGS. 1 and 2.
Figure 4:
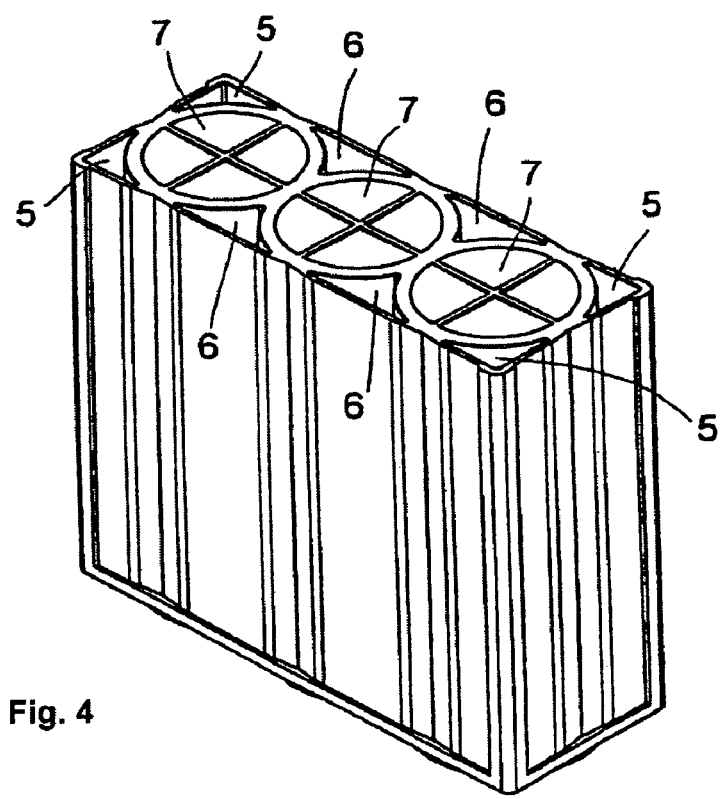
Figure 5:
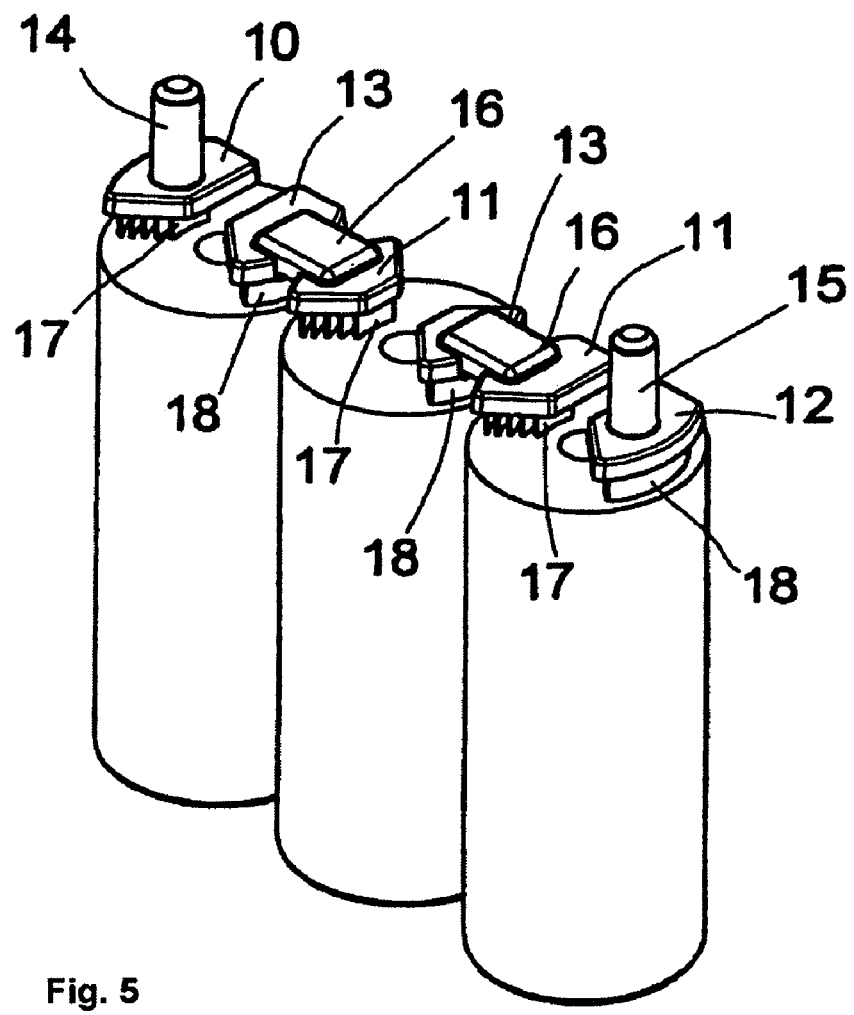
FIG. 5 shows a perspective view of three plates or electrode elements connected in series, housed in the recipient of FIG. 3 to shape the module of FIGS. 1 and 2.

5 into each corresponding cylindrical cavity in FIG. 3, the lower part of the inter-cell connectors indicated with 16 will rest on the edge, being housed inside the recesses indicated with 8 in FIG. 3.

Figure 1:
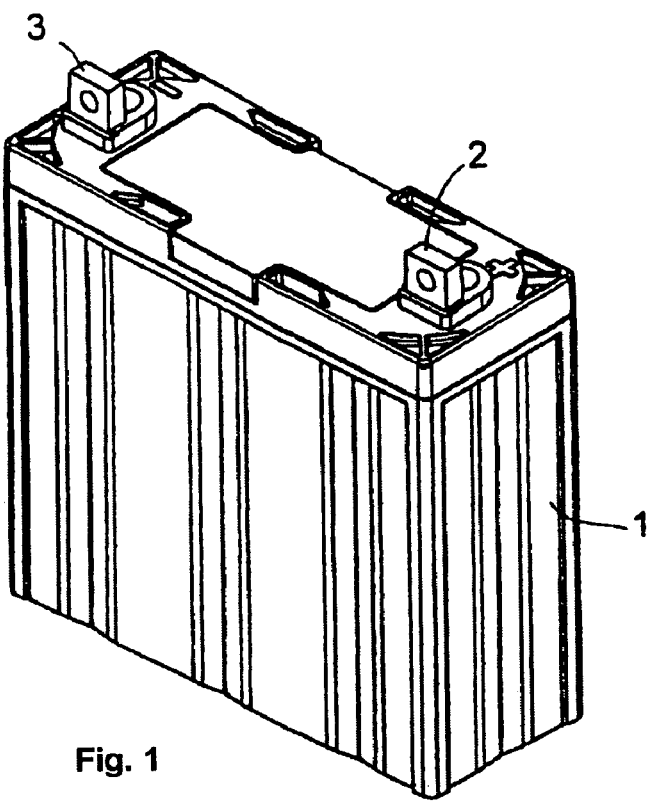
FIGS. 1 and 2 show upper perspective views of the three celled module arranged according to the invention.
Figure 6:
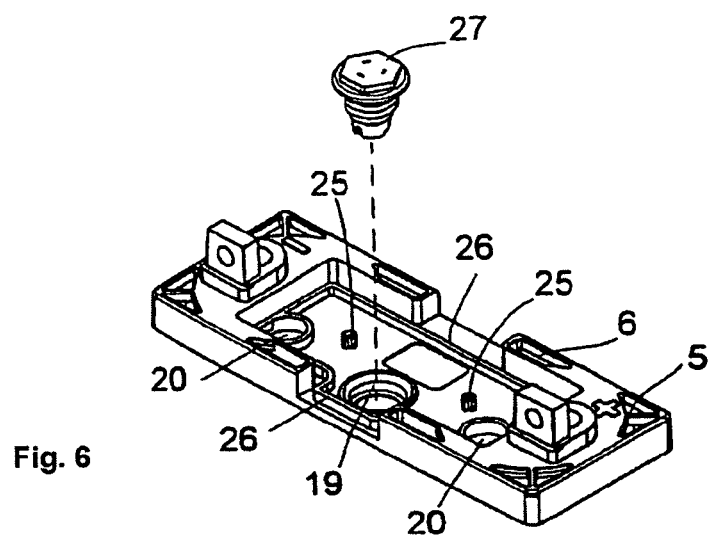
FIGS. 6 and 7 show upper and lower perspective views, respectively, of the lid included in the recipient of FIGS. 1 and 2; where the terminals and the screw stopper through which the gases generated in the three cells will exit.

FIG. 6 shows the first lid or lower lid of the battery module, object of the present invention; the purpose of this lid is to close the three module elements or cells, leaving only three holes for the electrolyte entrance before the formation or first charge of the plates and permitting the electric connection of the module by means of the outlet of the two terminals or poles; in the lower part of the figure, the lower part of the lid is shown, in which number 19 indicates the hole for inserting the security stopper, indicated with 27 in the upper part of the view of the figure, which will be subsequently described; the hole 19 here is shown as threaded, although this is non-limiting, since another insertion type for the valve can be used, such as those described in Spanish patent 2,134,149 from 1997; the hole 19 also serves as an electrolyte filling hole of the central element of the module in order to carry our the first charge formation of the battery. Number 20 indicates the two electrolyte filling holes of the end elements of the module. Number 21 shows the lower part of the lead bushing that, once welded to the corresponding terminal, will constitute the positive terminal or pole indicated with 2 in FIG. 1; likewise, number 22 shows the lower lead bushing of the negative terminal; these bushings are of lead and have a hollow part for passing and welding the corresponding terminal, another part with a labyrinth in the shape of concentric rings is embedded inside the material of the lid and the other two parts being the end areas protruding from said lid; the bushing area protruding from the lid on the upper part has the standardized shape of the selected terminal and is shown in FIG. 1 with numbers 2 and 3. The lower part of the bushing, shown with 21 in the positive case and 22 in the negative, is a lead cylinder to be riveted, in other words it is to be compressed against the material of the lid for the purpose of achieving the maximum effectiveness in the closure between the lead of the bushing and the plastic of the lid. Inside the lid, directing nerves are arranged, indicated with number 23, which serve to guide the lid and the recipient in the moment of welding so that it will be ensured on the entire surface to be welded, which in the case of the lid is indicated with 24 and indicated with number 9 in the recipient of FIG. 3. In the upper view of FIG. 6, number 19 also indicates the gas outlet hole of the module, which in turn is also the electrolyte filling hole of the central cell; number 20 also indicates the two electrolyte filling holes of the end cells. Number 25 shows the two directing protrusions of the welding of the first one with the second lid, which is carried out along the edge indicated with number 26, according to what will be described when commenting on FIG. 7. Numbers 5 and 6 show one of the end refrigeration holes and another of the central holes, coinciding with those described in FIG. 3. The only stopper used in the safety closure of the three celled module can be seen in the uppermost part of the figure, indicated with 27; this stopper is hollow and has an inner valve acting as a regulator of the internal pressure in the three celled module; the stopper 27 is shown above the hole 19 in which it is to be threaded; in this case, the stopper 27 closing system in the hole 19 by means of a thread is shown, but the threaded closing system does not intend to be limiting, but rather it could be of another type, such as those described in Spanish patents 2,134,149 from 1997, 2310 from 1999 and 1486 from 2000; however, using this type of safety valve introduced in a screw stopper implies a technological improvement on safety valves disclosed in said patents, since given its shape, it greatly reduces the interval of the valve opening and closing pressure values; the operation of this type of valves is the following: the possible gases generated within the three celled module, object of the present invention, create pressure inside the module and only when the pressure exceeds the opening level, they must exit, lifting a resilient valve housed in the inner body of the stopper 27; the operation of this valve consists of being resiliently deformed and opening the passage of gases outwards, when the inner pressure exceeds the opening pressure level and returning to its initial position, preventing the passage of air to the inside of the module, once achieving the closing pressure level; in this way, it is ensured that inside each module there is always a gas pressure preventing at all times the entrance of air from outside, since if the internal pressure were less than the atmospheric pressure, the entrance of air is impossible because the valve opening pressure would never be reached; if the internal pressure were greater than the atmospheric pressure, the air would not be able to enter the module interior, precisely due to that pressure gradient.

Figure 2:
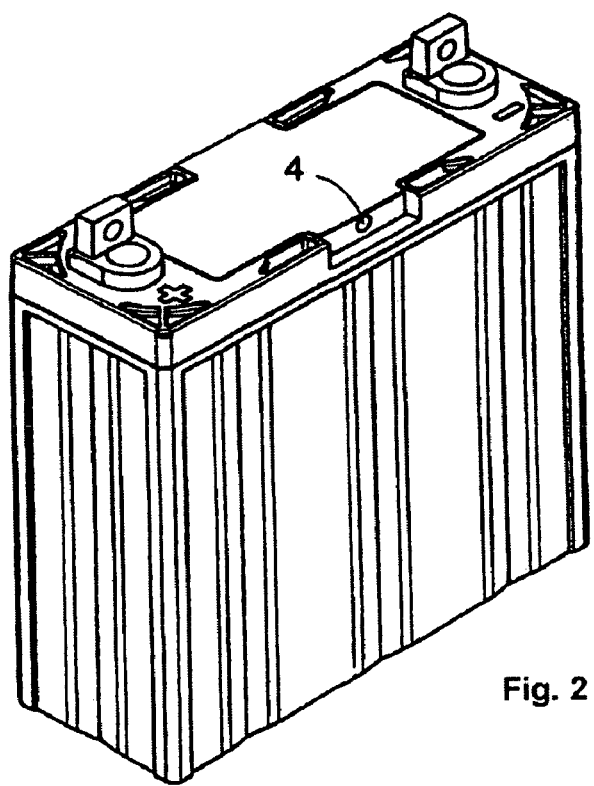
Figure 7:
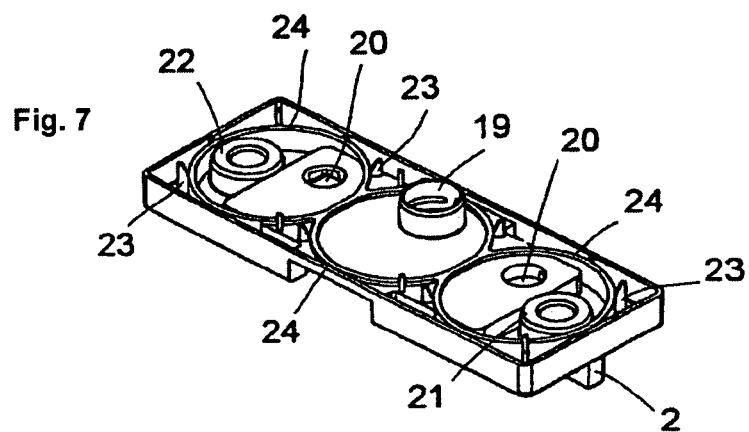

FIG. 7 shows the cap, or second lid used for closing the first lid in FIG. 6; in the drawings shown here, a single centralized gas outlet is arranged on one of the sides of the cap, through which the possible gases generated in each three celled module, object of the present invention, could escape, and here and in FIG. 2 is indicated with 4; however, this side gas outlet would not be limiting, as we shall see later on when defining the centralized gas outlet on the upper part of each module. In the lower part of the FIG. 6 drawing, the upper side of the cap is seen, completely flat in this case; in the upper part of FIG. 8, 32 indicates the welding edge serving as a closure with the first lid, whose corresponding welding edge was indicated with 26 in FIG. 6; so that this welding is completely ensured on the entire perimeter of the edges 26 and 32, FIG. 6 shows two plug directing guides indicated with 25, which must be introduced into the corresponding socket directing guides indicated with 28 in FIG. 8; closely observing the edges indicated with 26 and 32, whose perimeter is to be completely welded, the two holes of the end cells are seen, indicated with 20 in FIG. 6, they are sealed such that the possible gases released by the end cells can only exit through the hole of the central cell, indicated with 19 in FIG. 6; thus, all the possible gases released by the three cells of the module must only exit through the screw stopper 27 closing the hole 19; this stopper, as is known, has a resilient valve inside which opens and permits the possible inner gas to escape at a higher pressure than the atmospheric pressure and closing at a lower pressure than that of the opening, but also greater than the atmospheric pressure, so that the outside air cannot penetrate within the module; if the gases exited the module, they would be in the inner enclosure defined by the perimeter of the welded edges 26 and 32 and could only escape this enclosure through the hole indicated with 29, which is a cylindrical housing, inside of which there is a chip indicated with 30, generally heat-sealed in its entire circumference tangent to the walls of the hole 29; the chip 30 is of a microporous, plastic compound whose purpose is to permit the gas to escape outwards in such a diffused manner that it would slow or hinder the passage of a flame into the inside of the module; it is known that the gases released by lead-acid batteries consist of an oxygen and hydrogen mix; the oxygen is released from the positive plates of each-module, and although it should recombine on the negative plates surface and thus prevent hydrogen generation, however in certain very extreme conditions of applying an excessively elevated charge voltage or by an excessive temperature, the hydrogen could exit, evolving from the negative plates, and it could generate a pressure inside the module exceeding the safety valve opening pressure and then an oxygen and hydrogen mix would exit through the valve of the stopper 27, looking for an outlet to the outside through the microporous chip shown with number 30, obliging all the possible gas released by the battery to be diffused through the micropores, such that it would prevent the hydrogen gas concentration and thus avoid generating a possible flame generated by a spark possibly produced near the gas outlet; with this property of the microporous material of permitting the exit of those gases by diffusing them through the pores, it is assured that the chip 30 acting as a non-return flame or fireproofing system is achieved. preventing a flame formed outside from penetrating the accumulator in the hypothetical case that possible outer sparks caused the hydrogen that could have been released from the battery to burn, especially when it charges in extreme voltage and temperature conditions; the hole 29 is connected to the exterior by means of the passage indicated with 31, permitting the passage of the possible gases, already diffused, outwards, exiting through the hole indicated with 4 in the drawing in the lower part of FIG. 6.

Figure 10:
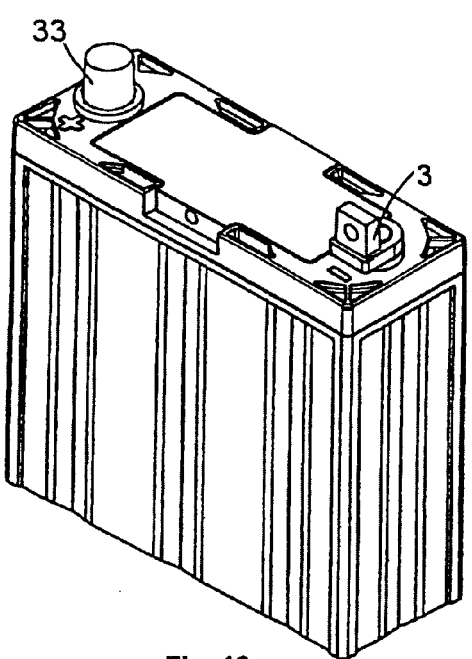
FIGS. 10 and 11 show upper perspective views of the module of the invention provided with different terminals or current taps.
Figure 11:
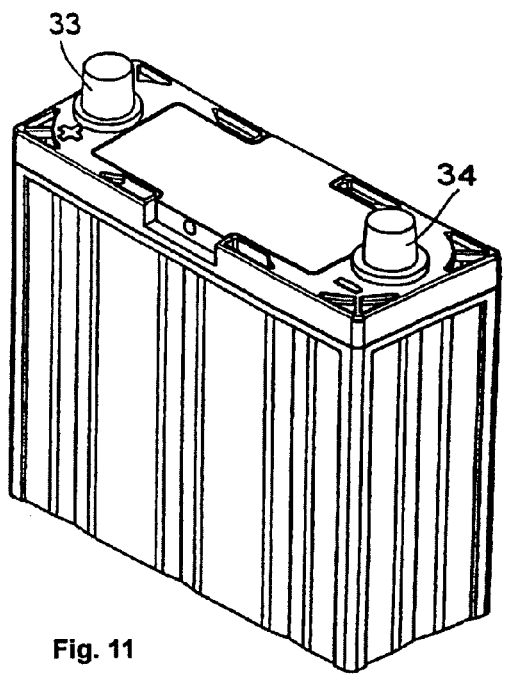
Figure 13:
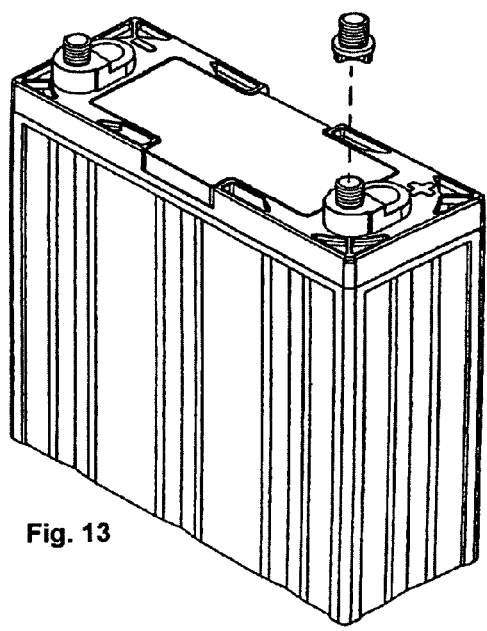

FIGS. 10 and 11 show modules provided with terminals or poles differing from those shown in FIGS. 1 and 2 for the purpose of showing different outlet types for the electric connection of one module to another. which will be commented later; number 33 indicates the standardized DIN positive terminal; in FIG. 10, the standardized DIN negative terminal is indicated with 34; as can be seen, the pair of terminals to be used in each module does not have to be of only one type, but rather they can be freely combined, a DIN terminal with the opposite terminal of the angular type, for example, as can be seen in the left-handed part of FIG. 10. FIG. 13 shows two modules with threaded terminals.

Figure 14:
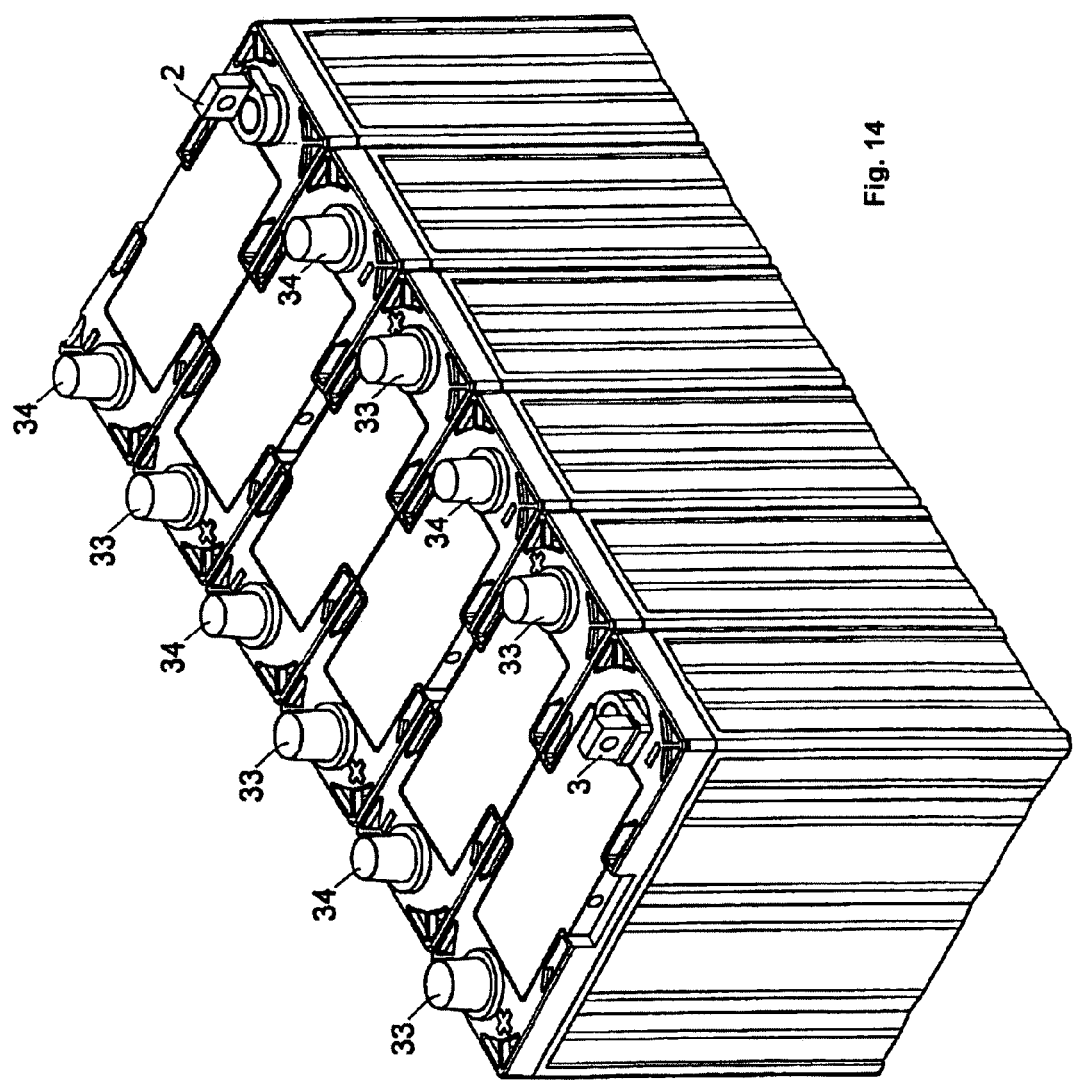
FIG. 14 shows one of the possible groupings of six modules to form the 36V battery; in this case, the general current tap terminals for 36V are of a different type than those connection terminals between modules, which are of the DIN type.

FIG. 14 shows six modules, grouped such that their connection to form a 36V battery is provided; 2 and 3 show the positive and negative angular type terminal, respectively, and 33 and 34 show each one of the positive and negative DIN terminals, respectively.

Figure 15:
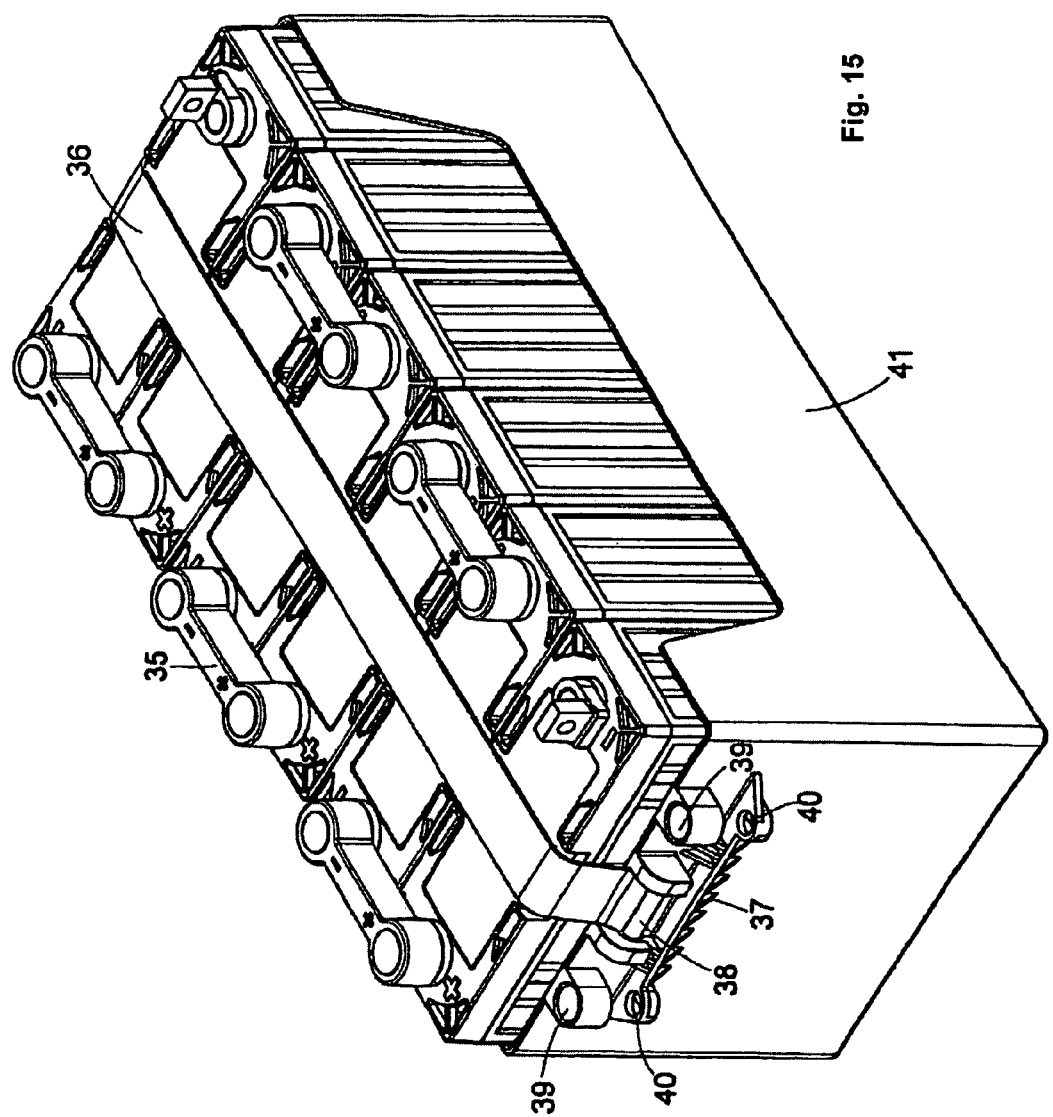
FIG. 15 shows the battery formed by the modules in FIG. 14, in which the terminals of said modules are connected in series and are introduced into the general recipient containing them; here the modules have been shown as held by a resilient band to immobilize them against vibrations.

FIG. 15 shows a 36V battery formed by the six modules arranged like in FIG. 14; the series connection of every two modules is controlled by snap-fit means of the five connectors indicated with 35; these connectors can be manufactured of a material that conducts better than lead, as they will not be exposed to etching; on the other hand, placing and holding the connectors on the terminals is aided by the frusto-conical shape of the DIN terminals and by the difference of diameters between the positive 33 and negative 34 terminal; in the figure, the module assembly has been introduced into a containment indicated with 41, whose dimensions and shape have been calculated to contain the module assembly constituting the 36V battery; to hold the module assembly, a strip indicated with 36 has been arranged above it, preferably of elastic and being anchored to the protrusions 38 of the containment side, permitting the six modules to be fixed and immobile in their place of the containment, a truly important matter in order to avoid damages caused by vibration, considering that one of the main applications of the 36V batteries is the automobile starting, so that it will be exposed to the vibrations caused by traveling on the highway; the anchoring shown here is also essential for the operation of the battery on its side, which could be a necessity required by the automobile builders, for the purpose of using impossible placement locations for standard batteries, since they can only work in a vertical or upright position; number 37 indicates what shows a protrusion or fixed handle for handling and carrying the containment or the battery; on the two ends of the handle 37, there are holes indicated with 40 facing the two holes indicated with 39; the plastic cord could be passed through these four holes for a type of handle, of those commonly used for handling and carrying batteries. In addition, the holes indicated with 39 will serve to hold the lid of the containment as shall be seen later.

Figure 8:
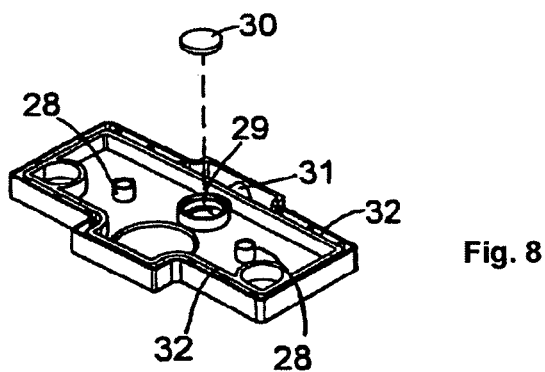
FIGS. 8 and 9 show upper and lower perspective views, respectively, of the cap closing the lid of FIG. 6; in it, the porous polymer chip serving as a fireproof system has been shown, contributing to the safety of using the battery.
Figure 9:
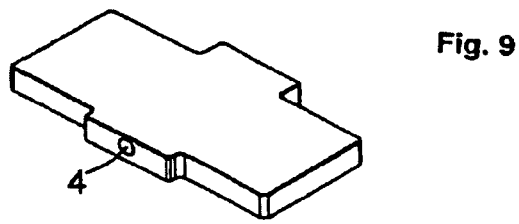
Figure 16:
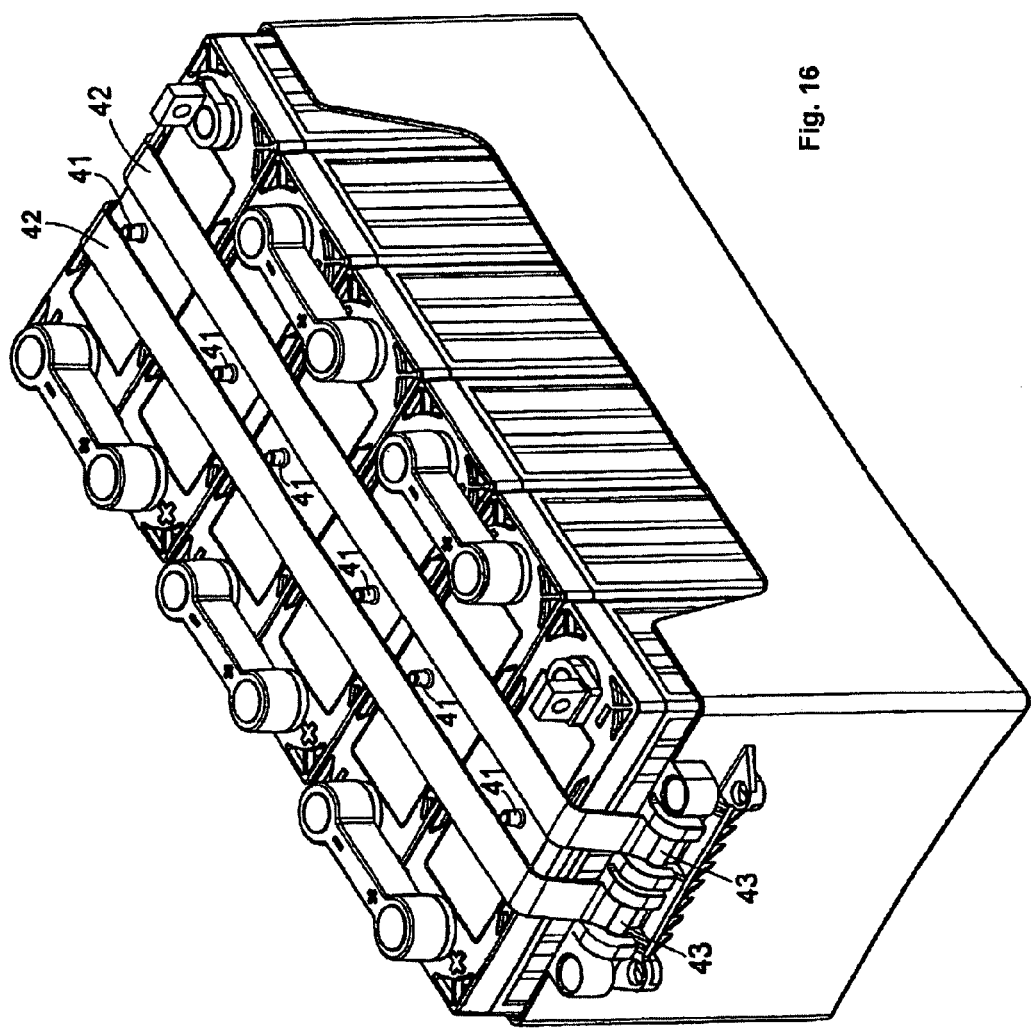
FIG. 16 shows a 36V battery composed of six modules which are connected and introduced into its definitive recipient like the modules in FIG. 15; however, the resilient bands which ensure immobility permit the gases to exit through vertical tubes located on the upper part of each module.

FIG. 16 shows a 36V battery slightly different from the one shown in FIG. 15; in this case, the gas outlet of each module is in the upper part of the cap or second lid, different from the side outlet shown in the previous figures, in which the side outlet 4 has been changed for the outlet in the shape of a chimney indicated with number 41; it is understood that the hole 29 with its corresponding microporous, plastic material chip 30 incorporated in the hole is under the chimney 41, as had been described in FIG. 8; the fixing of the modules within the containment is shown here with two resilient bands indicated with 42, which in turn are fixed and tightened in the protrusions indicated with 43.

Figure 17:
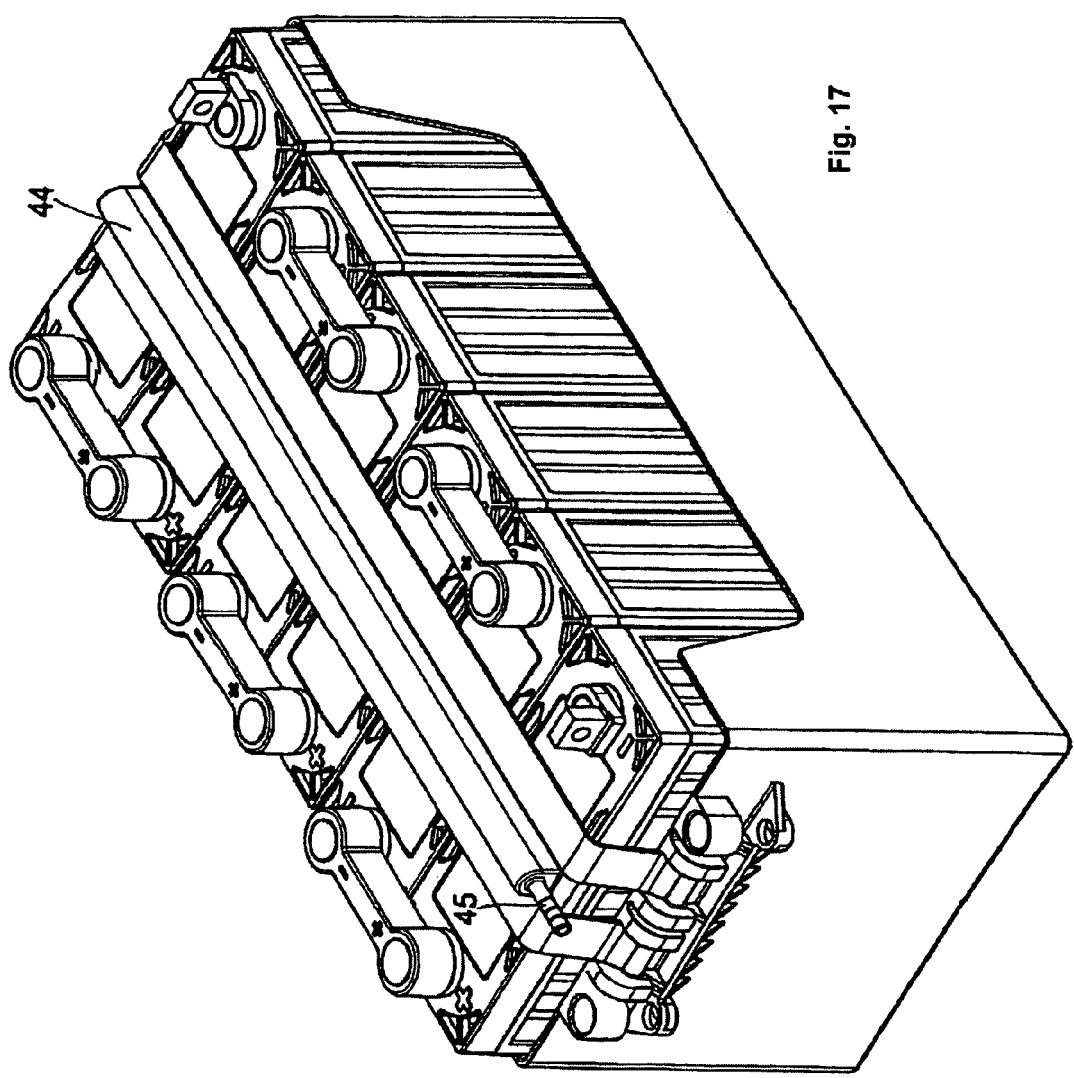
FIG. 17 shows a view similar to that shown in FIG. 16, including a general and centralized gas outlet.

FIG. 17 shows one of the possible solutions for the hypothetical gases coming from the battery shown in FIG. 16, they are driven through a single tube indicated with 44 towards an area 45 of connection with another tube, preferably flexible, which will drive them towards an exhaust preferably outside of the vehicle, thus providing a possible solution to the problem of contaminating the driver's interior area in the case of the battery being located in it.

Figure 18:
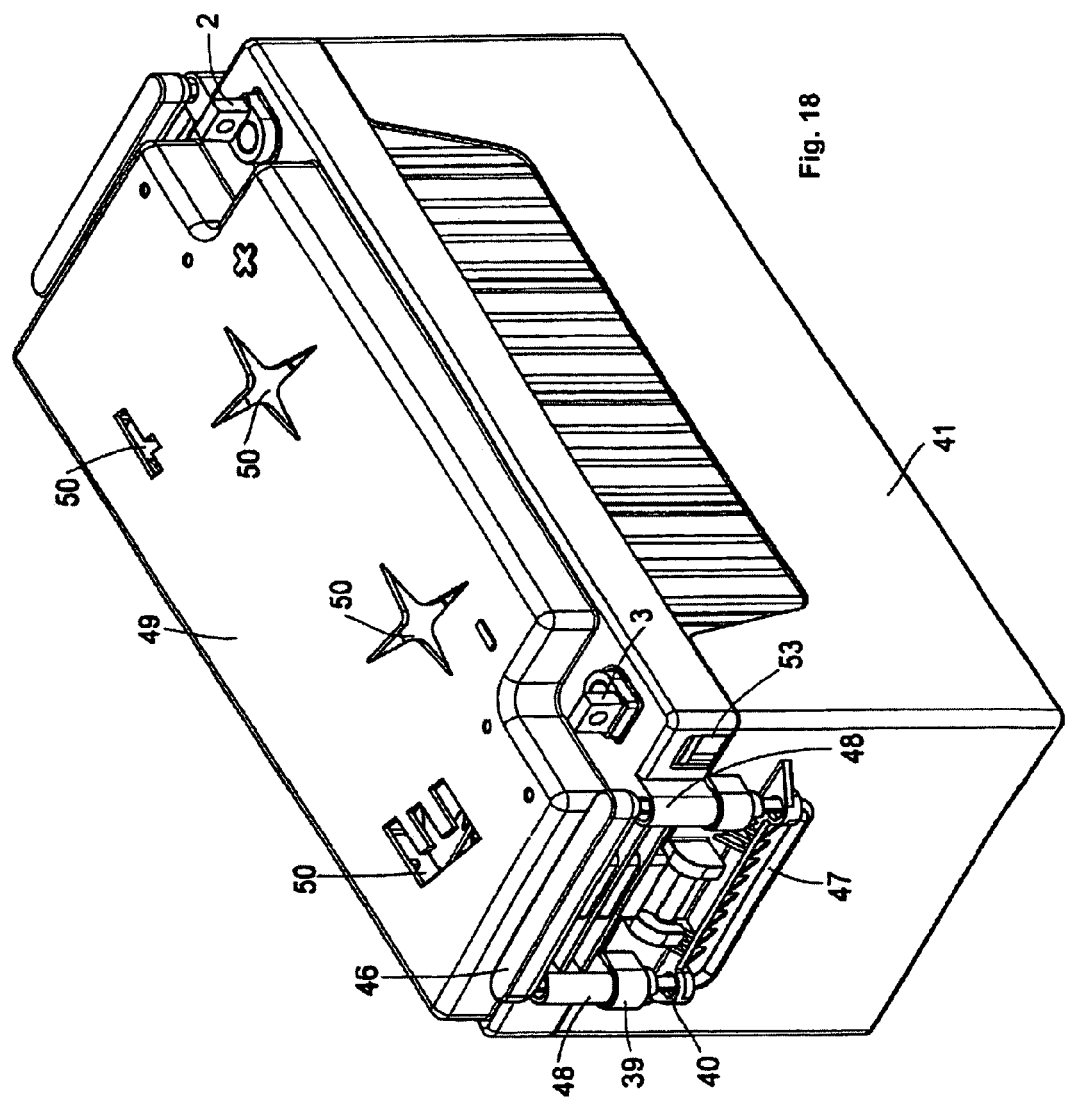
FIG. 18 is an upper view of a 36V battery assembled like the one in FIG. 15 but with its general corresponding lid; this lid has perforations for passing the terminals and for the circulation of the refrigerating air of the cells; in this figure, the location of the handles to aid in handling the battery can be seen in detail.

FIG. 18 shows a completely finished battery, arranged to be used; on the containment containing the six modules of three cells indicated with number 41, the lid indicated with number 29 is arranged, from which the positive and negative battery terminals emerge, indicated with 2 and 3, respectively; the lid is fixed to the containment by means of the grooved plugs indicated with 48, introduced in the holes indicated 39 on the side of the containment; the lid has perforated areas indicated with 50 which permit the passage of heat through them for the purpose of preventing the concentration of hot air resulting from the heating characteristic of the battery operation. Number 46 shows the wire handle grips mentioned when describing FIG. 15, number 47 precisely marks the wire of one of the handles, passing through the holes 40 of the containment and also through the grooved plugs 48 of the lid.

Figure 19:
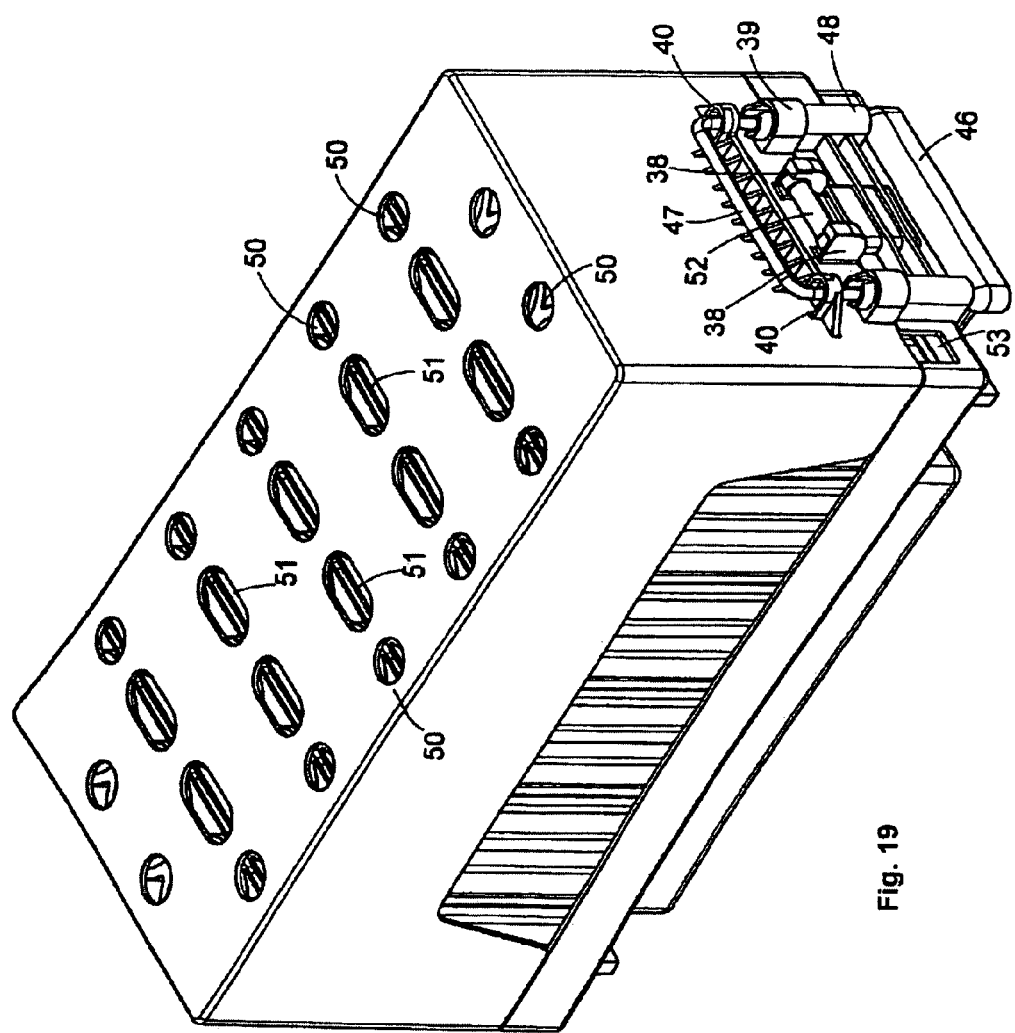
FIG. 19 shows a lower view of the same battery shown in FIG. 18; in it, the bottom of the general recipient can be seen with the corresponding openings coinciding with the refrigerating air passages of the cells.

For the purpose of distinguishing the details of the lid assembly, FIG. 19 shows the same battery as FIG. 18 but from below of the fixing band, whose anchoring with the cylinder 32 in the protrusion 38 and also the construction details of the handle; moreover, this view is offered to see that the bottom of the containment is perforated by two types of holes: some are of the circular type indicated with 50 and others are oval shaped indicated with 51; the oval shaped holes will permit a greater passing of refrigerating fluids, air, water and others through them than through the circular holes, given that the oval shaped ones are located in the more difficult to refrigerate central areas and the circular ones are located in the outer areas of the battery.

Figure 20:
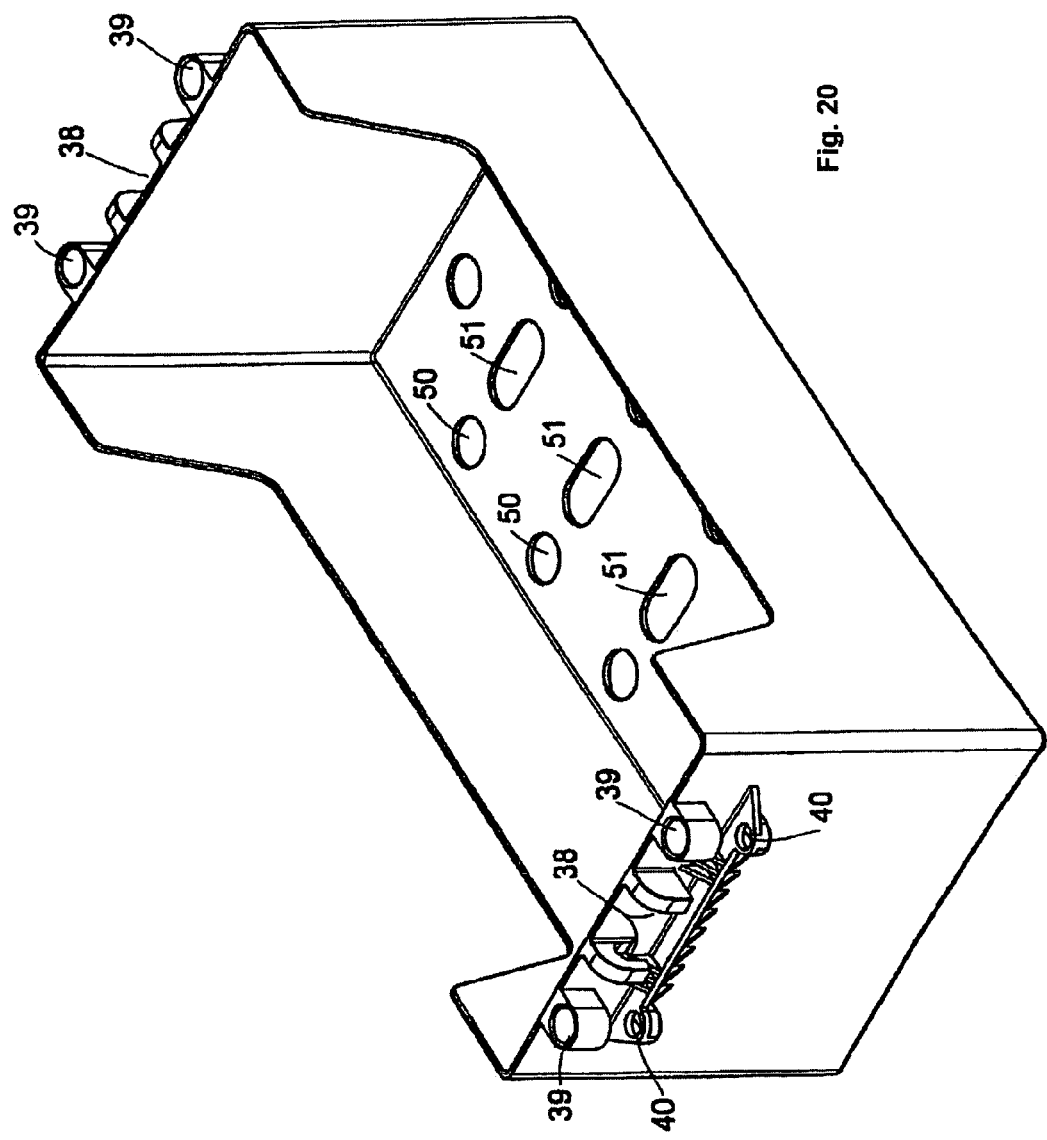
FIGS. 20 and 21 show upper and lower views, respectively, of the general recipient mentioned in FIG. 18.

FIG. 20 shows the containment from above; in this drawing, it is important to see in detail the catch of the containment to anchor the resilient holding band, indicated with 38, for the purpose of seeing where the end cylinder of the band is to be introduced, indicated with 52 in FIG. 19.

Figure 21:
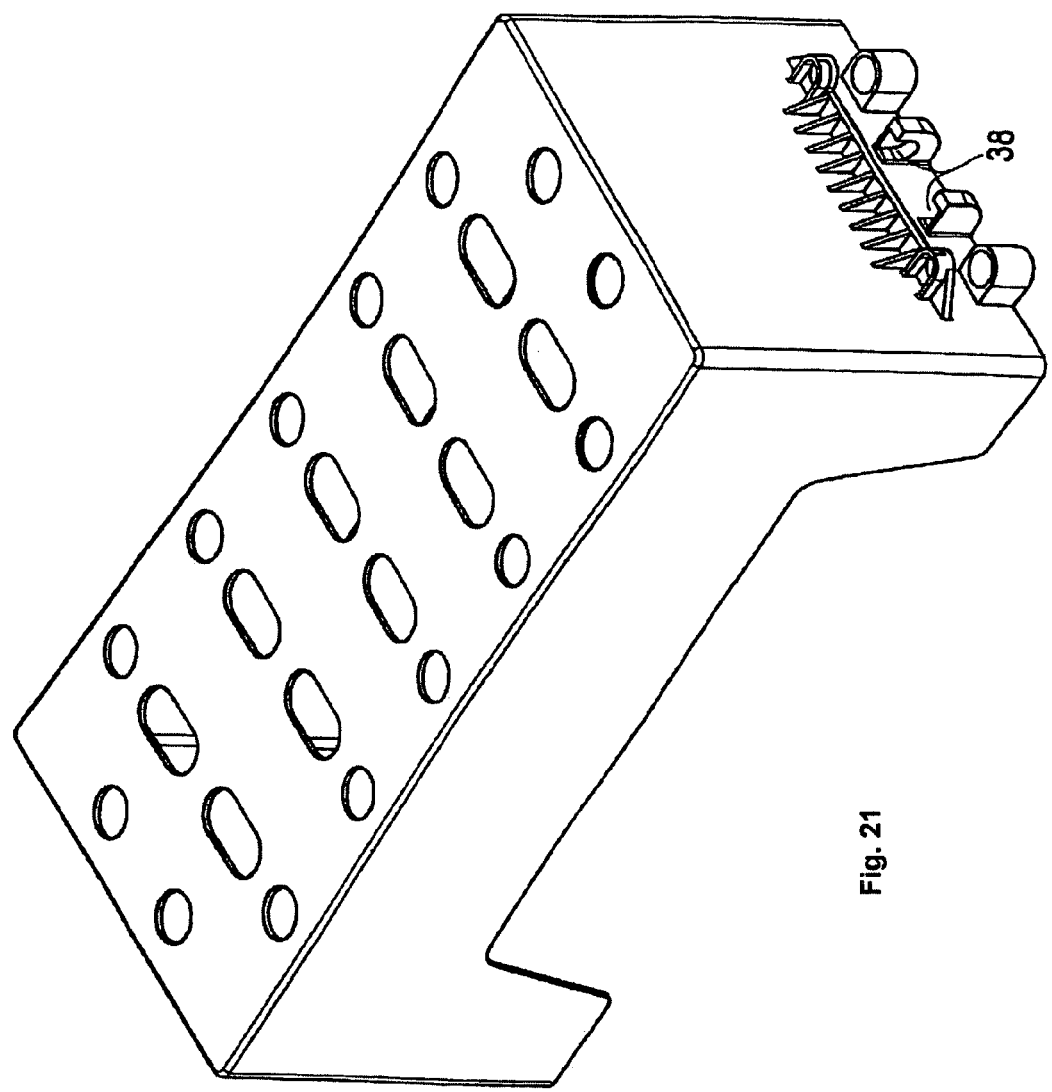

FIG. 21 shows the containment from below; the anchoring socket of the holding band indicated with 38 can be seen here in detail.

Figure 22:
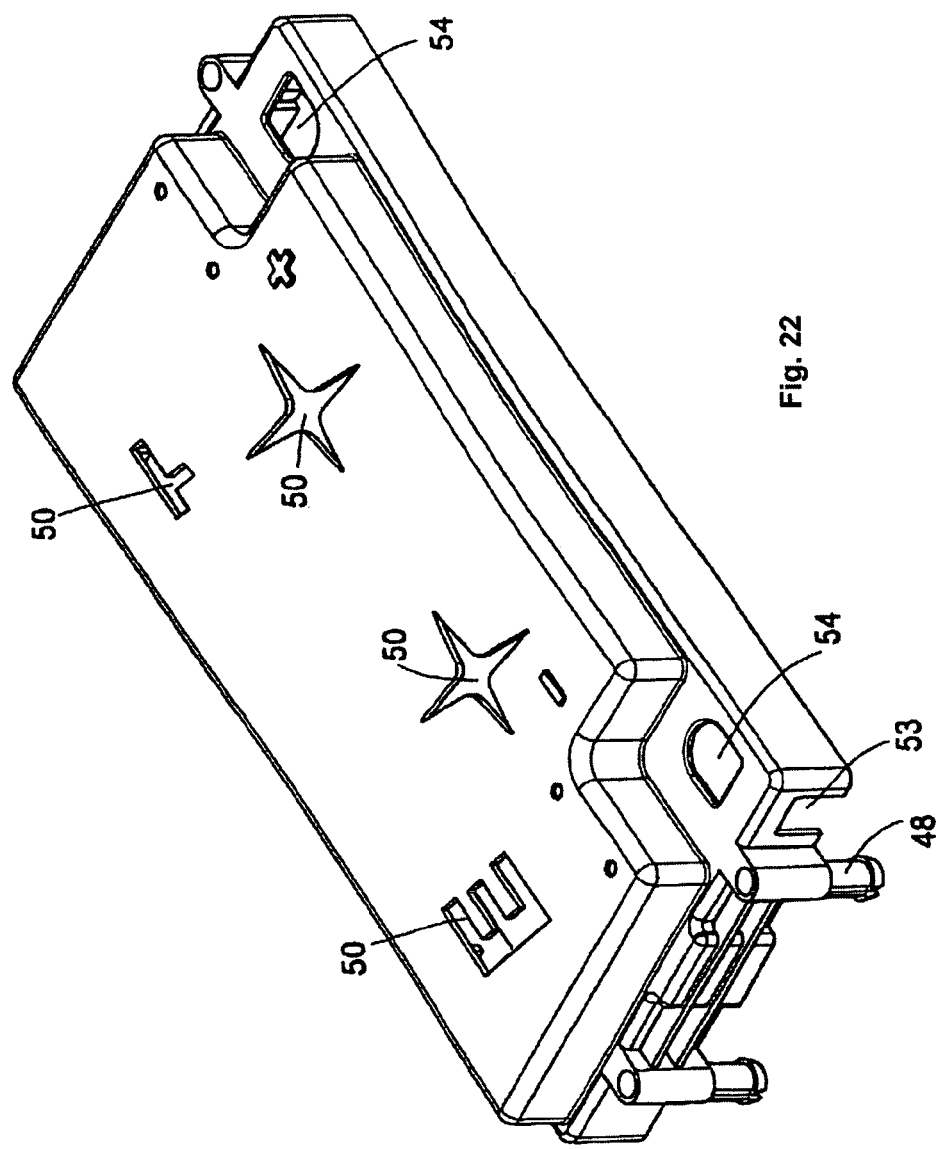
FIGS. 22 and 23 show upper and lower views, respectively, of the general lid, which shows the holes for the terminals or poles outlet and for the free circulation of the refrigerating air of the unitary cells of the battery; they also show in detail the guides through which the wire handles aiding in handling the battery pass.

FIG. 22 shows the 36V battery lid from the upper part; with clarity, it shows the holes for the terminal openings indicated with 54 and the protection holes for the current taps, that is to say of the housings of the terminal covers, indicated with 53.

Figure 23:
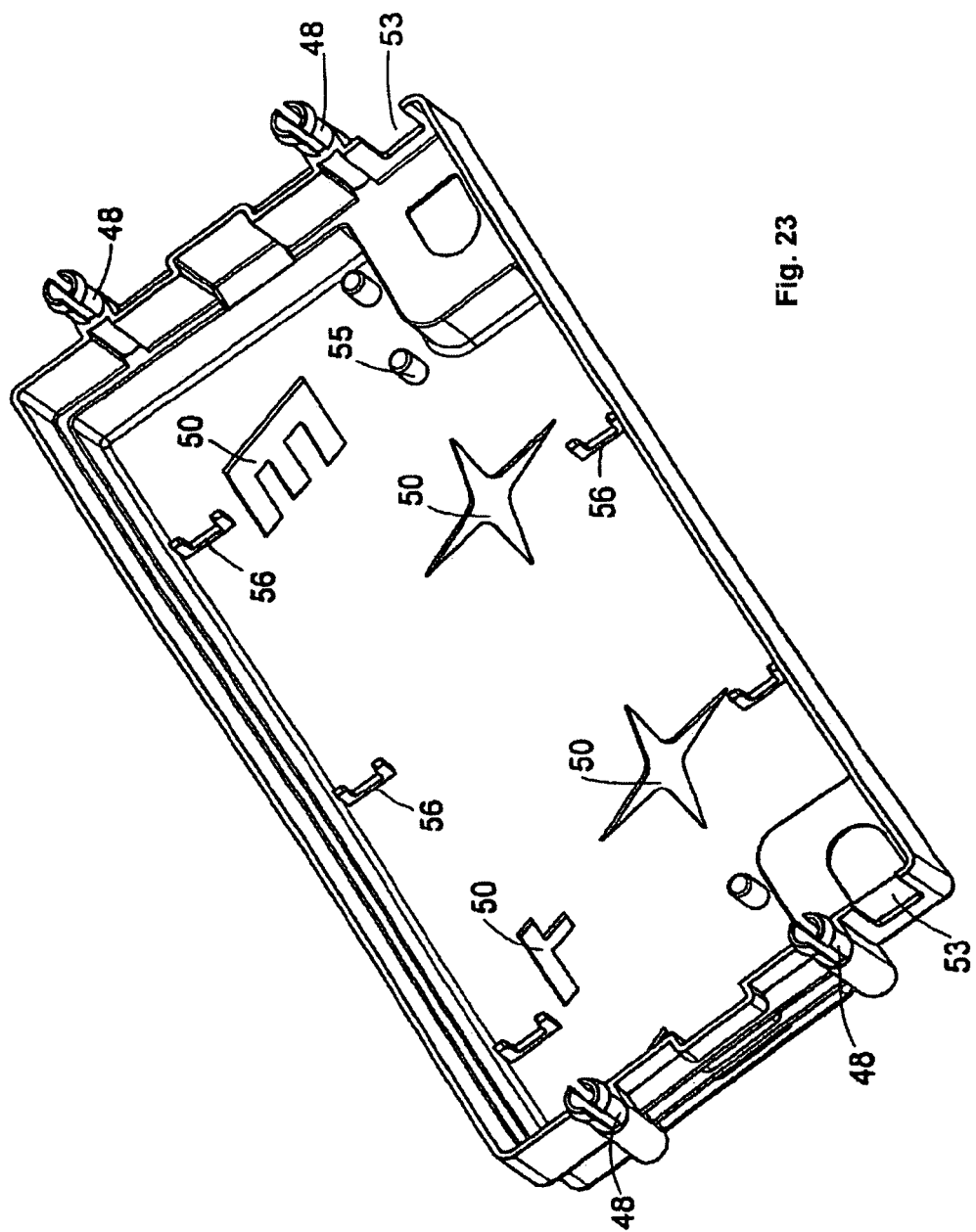

FIG. 23 shows the details of the cylindrical protrusions indicated with 55 or the U-shaped ones indicated with 56, serving so as to keep the lid at an equal distance from the high part of the modules, said grooved plugs 48 for holding the lid to the containment can be seen in detail as well.

Figure 12:
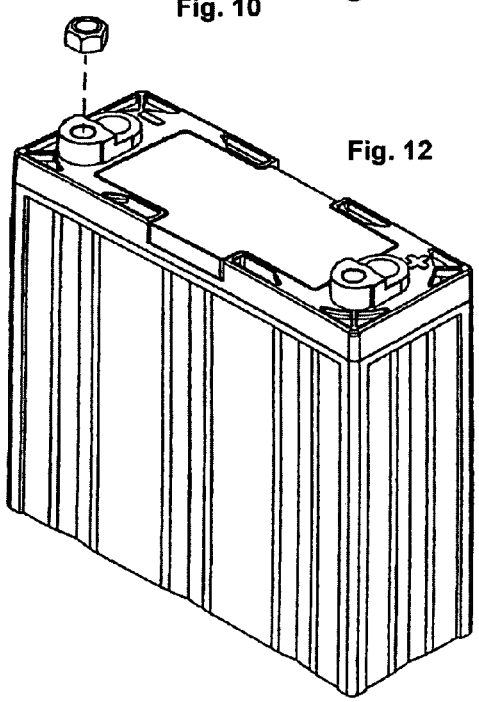
FIGS. 12 and 13 show the modules provided with threaded terminals.
Figure 24:
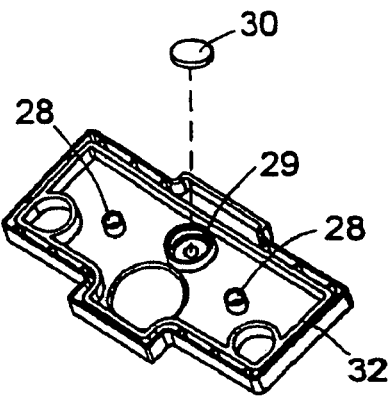
FIGS. 24 and 25 show a lower and upper view of a cap of the three celled module; in this cap, the gases are driven towards a single passage through a microporous chip and exit outwards through a tube in turn introduced into the general centralized gas outlet tube, shown in FIG. 26.
Figure 25:
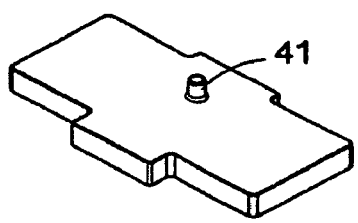

FIGS. 24 and 25 show in detail the cap or second lid of a module whose gas outlet 41 is foreseen on the upper part to constitute the batteries shown in FIGS. 11 and 12.

Figure 26:
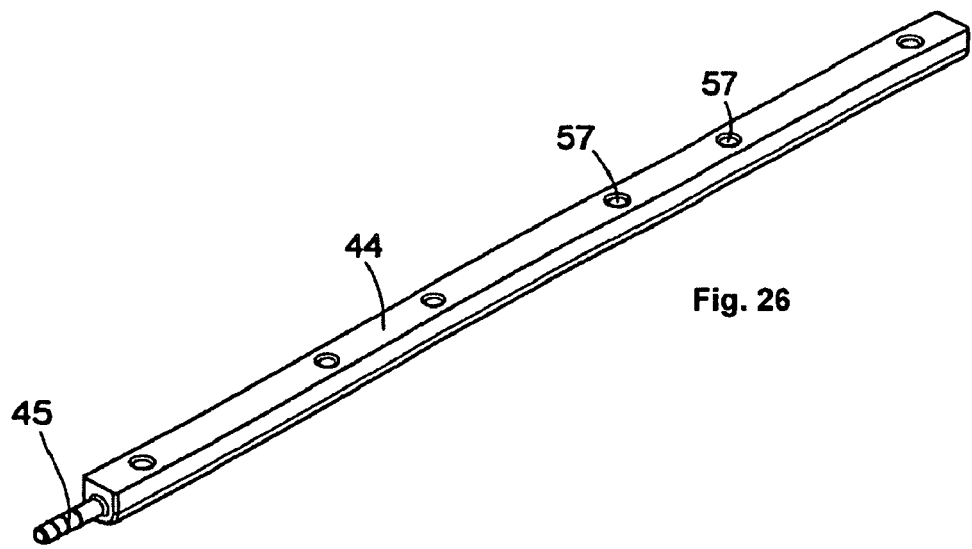

FIG. 26 shows in detail the gas collector indicated with 44 in FIG. 17; the holes indicated with 57 must be inserted on the chimneys indicated with number 41 in FIG. 16; this tube constitutes a possible solution to the centralized gas outlet to the outside of the vehicle, which in this manner could be located in the interior driver's area.

Figure 27:
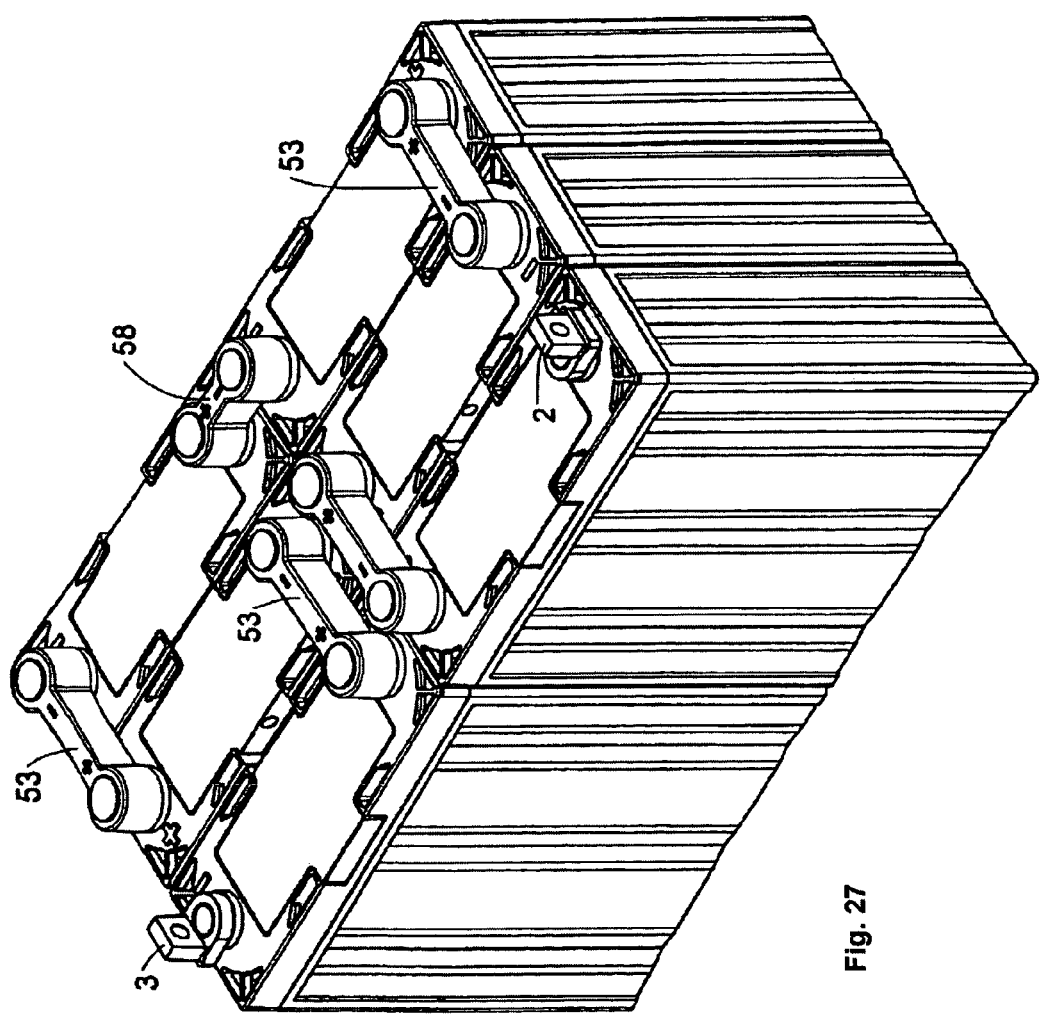
FIGS. 27, 28, and 29 show views of three different manners of connecting the modules of the invention to achieve 36V batteries.

FIG. 27 shows a view of a 36V battery with a different scheme than that shown in FIGS. 14, 15, 16, 17 and 18; although the six modules are connected in series, however the shape of the battery is different, giving resulting dimensions of less length and larger width of the battery, which offers a possibility of manufacturing a battery with the same voltage rating and capacity features, but in two different dimensions, such that it can be better adapted to the possible spaces conceived for locating the battery in the vehicle; when batteries of the type shown in FIGS. 14 to 17 are manufactured, the outer terminal connectors indicated with 53 are all the same dimension; however, with the model shown in FIG. 21, four connectors of the same type 53 and a shorter one indicated with 58 will be used.

Figure 28:
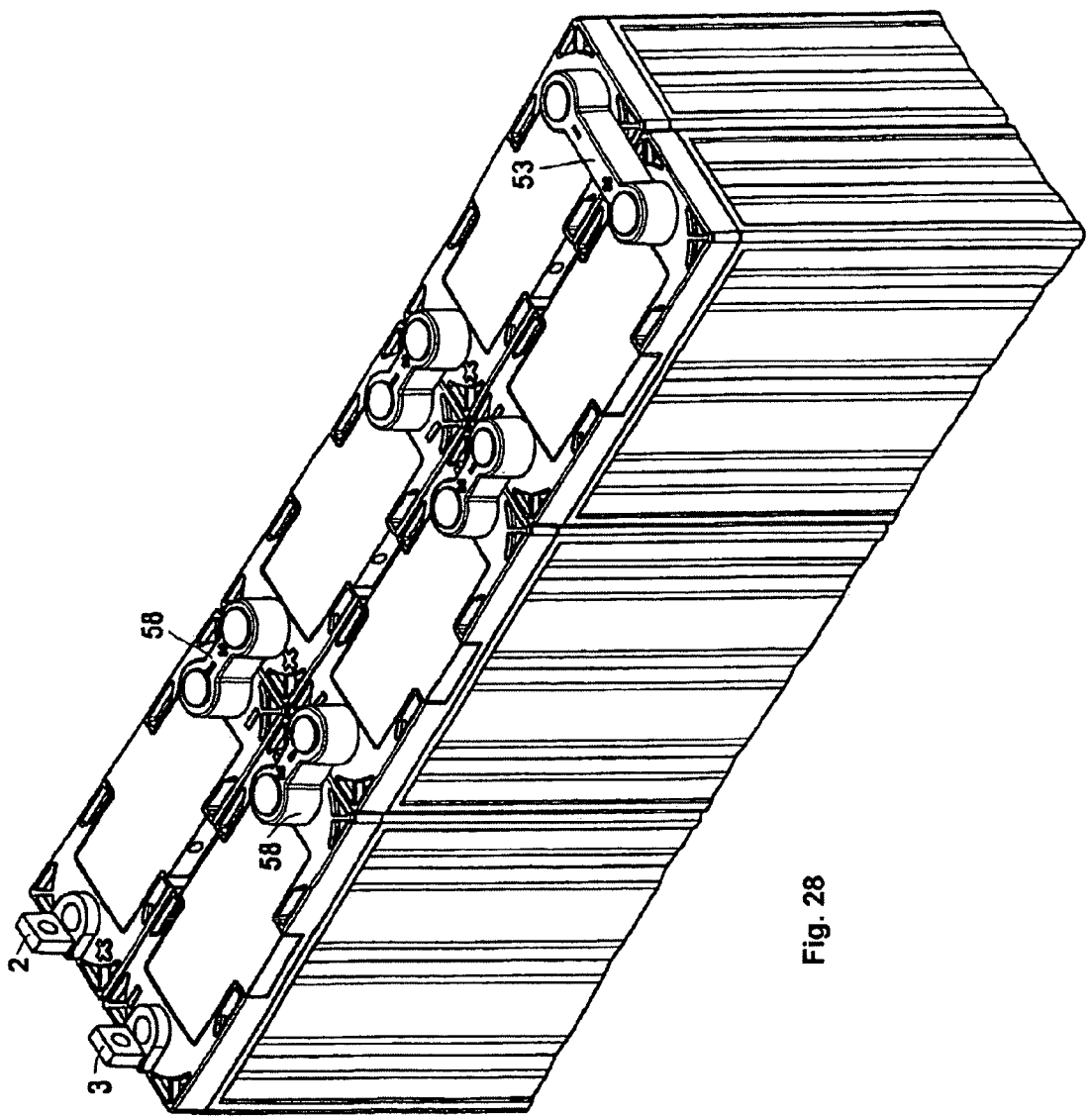
Figure 29:
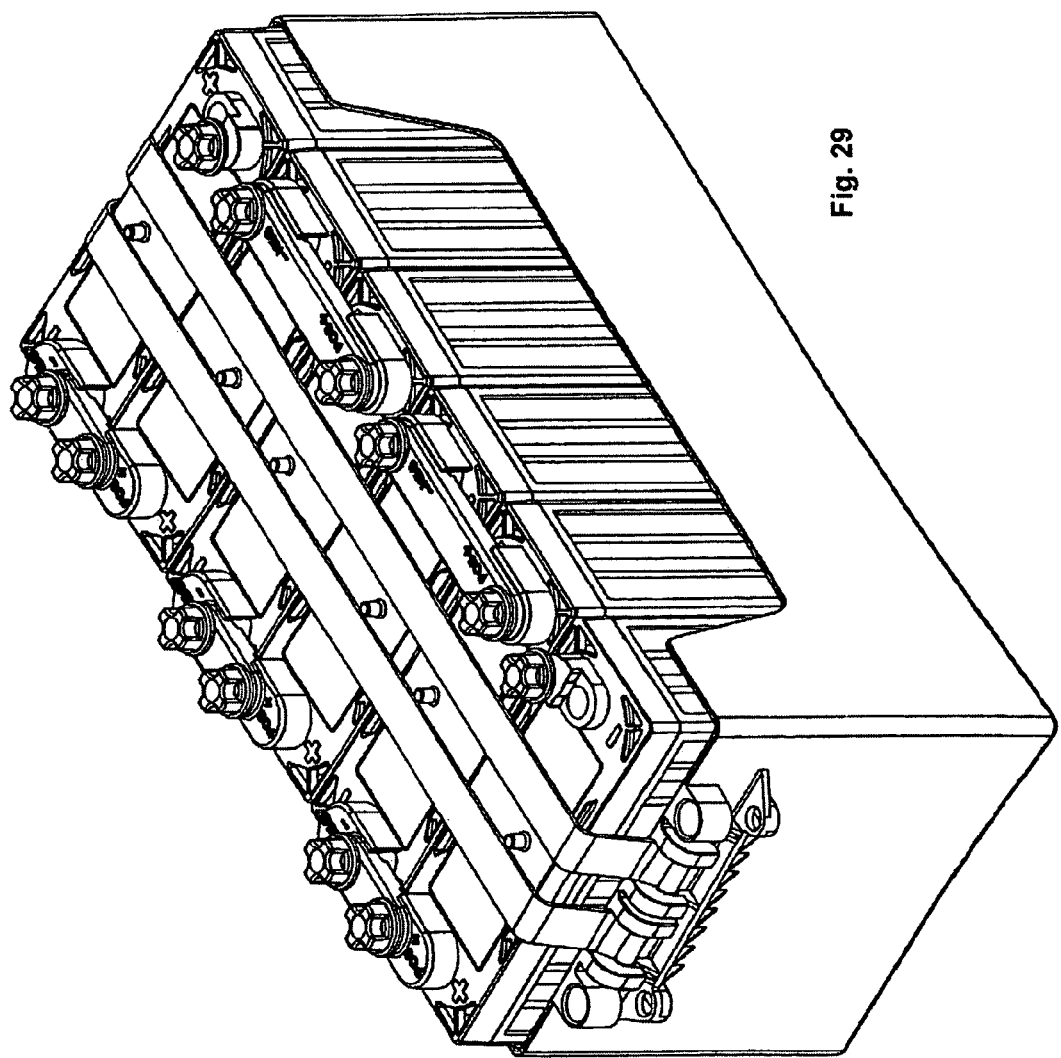

FIGS. 28 and 29 show two other ways to connect the modules. FIG. 28 shows a standardized shape for using in trucks and FIG. 29 shows a standard starter battery model, with all special threaded terminals.

The invention claimed is:

1. Electric accumulator battery, comprising independent modules, each one of which comprises a recipient with a lid, internally subdivided into cells in which positive and negative helically wound electrodes and an intermediate separator are housed, which modules have electric connection terminals and are housed in a containment, characterized in that the recipient of each module comprises an outer wall, of parallelepiped shape, and an inner wall defining three cylindrical cells, being two-to-two tangent, of coplanar axes and closed on the lower base; between whose inner and outer walls axial ventilation passages are defined, passing through the base and lid of the module, and in that the modules are connectable in different configurations so that different battery shapes and/or battery voltages are attained and further characterized in that the cylindrical cells defined by the inner wall of the recipient of the modules have a gap from an upper edge of the inner wall in coincidence with a tangency span, in which a connector is tightly coupled.

2. A battery according to claim 1, characterized in that the bottom of the cylindrical cells is reinforced by means of outer ribs.

3. An electric accumulator battery, comprising independent modules, each one of which comprises a recipient with a lid, internally subdivided into cells in which positive and negative helically wound electrodes and an intermediate separator are housed, which modules have electric connection terminals and are housed in a containment, characterized in that the recipient of each module comprises an outer wall, of parallelepiped shape, and an inner wall defining three cylindrical cells, being two-to-two tangent of coplanar axes and closed on the lower base; between whose inner and outer walls axial ventilation passages are defined, passing through the base and lid of the module, and in that the modules are connectable in different configurations so that different battery shapes and/or battery voltages are attained, characterized in that the lid of each module has a peripheral wall on its lower surface, facing the outer wall of the recipient, and three tangent inner annular walls facing the edge of the cylindrical cells delimited by the inner wall of the recipient; between whose outer and inner walls the bottom of the lid, has openings facing the module ventilation passages; said lid also having a hole for electrolyte filling inside of the central circular wall and two openings inside of the end circular walls; one for electrolyte filling and the other one provided with a lead bushing hermetically fixed to the edge of the hole and through which a current tap terminal passes and is fixed.

4. A battery according to claim 3, characterized in that said lid has a central slot on its outer surface, in which the three electrolyte filling boles are located, whose slot is covered and closed by means of a cap of the same shape sealing the filling and ventilation holes of the lid for the outer cells and having a gas outlet facing the central opening of the lid for filling and ventilation of the intermediate cell.

5. A battery according to claim 3, characterized in that the opening of the lid facing the central cell closes by means of a stopper provided with a safety valve for regulating a gas outlet.

6. A battery according to claim 4, characterized in that in the gas outlet hole of the cap, a microporous plastic chip is assembled through which the diffused gases exit.

7. An electric accumulator battery, comprising independent modules, each one of which comprises a recipient with a lid, internally subdivided into cells in which positive and negative helically wound electrodes and an intermediate separator are housed, which modules have electric connection terminals and are housed a containment, characterized in that the recipient of each module comprises an outer wall, of parallelepiped shape, and an inner wall defining three cylindrical cells, being two-to-two tangent, of coplanar axes and closed on the lower base; between whose inner and outer walls axial ventilation passages are defined, passing through the base and lid of the module, and in that the modules are connectable in different configurations so that different battery shapes and/or battery voltages are attained, characterized in that said containment comprises a straight rectangular prismatic receptacle having shorter walls and longer walls, open at its upper base, dimensioned to tightly receive a series of modules exteriorly backing each other and electrically connected in series, said receptacle having openings on the bottom facing the axial ventilation passages of said modules, while near a free edge, the shorter walls have external anchoring means for holding strips or bands crossing over the modules housed in the containment to retain them.

8. A battery according to claim 7, characterized in that the receptacle shaping the containment is closed by means of a lid provided with holes for the passage of the connection terminals and ventilation holes.

9. A battery according to claim 8, characterized in that on their shorter walls, the receptacle and lid have outwardly arranged passages perpendicularly facing the bases, through which a plurality of grooved anchoring plugs are introduced, inside of which cords of a carrying handle pass.

10. A battery according to claim 7, characterized in that a ventilation nozzle protrudes through the cap closing the slot of the lid of the modules, all the aligned nozzles of the backed modules being connected to a collector tube, one of whose ends is closed, while the other ends in a coupler for connecting a gas evacuation conduit.

* * * * *

UNITED STATES PATENT AND TRADEMARK OFFICE
CERTIFICATE OF CORRECTION

| | |
|---|---|
| PATENT NO. | : 7,094,496 B2 |
| APPLICATION NO. | : 10/210343 |
| DATED | : August 22, 2006 |
| INVENTOR(S) | : Rafael Ruiz Rodriguez et al. |

Page 1 of 1

It is certified that error appears in the above-identified patent and that said Letters Patent is hereby corrected as shown below:

Col. 11, Line 45 please delete "tbrough" and insert --through--

Col. 12, Line 35 please delete "tangent of" and insert --tangent, of--

Col. 12, Line 16, please delete "boles" and insert --holes--

Signed and Sealed this

Sixth Day of March, 2007

JON W. DUDAS
*Director of the United States Patent and Trademark Office*